May 5, 1964   R. CUNY   3,131,939
SHAFT SEAL FOR GAS-FILLED MACHINE
Filed Oct. 12, 1961

INVENTOR.
Robert Cuny
BY
Pierre Scheffler & Parker
Attorneys 3,131,939
SHAFT SEAL FOR GAS-FILLED MACHINE
Robert Cuny, Wettingen, Switzerland, assignor to Aktiengesellschaft Brown, Boveri & Cie, Baden, Switzerland, a joint-stock company
Filed Oct. 12, 1961, Ser. No. 144,732
Claims priority, application Switzerland Oct. 14, 1960
6 Claims. (Cl. 277—15)

For closed gas-filled machines, particularly hydrogen-cooled electric turbogenerators, a reliable seal for the machine casing is of great importance. In order to prevent the escape of cooling gas from the machine at the point where the shaft passes through the casing, liquid seals are used whereby the sealing liquid is kept in circulation. The liquid, preferably oil, which is supplied under pressure, produces in an annular chamber or groove a barrier which prevents the cooling gas from escaping from the machine. Due to the fact that gas is soluble in the liquid, the latter absorbs air and transfers it to the gas filling inside the machine. To prevent this, the sealing liquid is deaerated by a vacuum treatment and this requires comparatively large degassing devices when the hydrogen pressure is high. In such plants there are correspondingly high gas losses and foaming tends to occur.

Moreover it has already been proposed in connection with shaft seals for gas-filled machines to use a sealing liquid which passes through the seal in two parallel paths, one of these sealing liquid streams being saturated with hydrogen and the other one with air. With this kind of double seal it is unavoidable that a certain amount of sealing liquid flows from one circuit to the other, even when the pressure regulation system operates so as to maintain equal pressure in the two circuits or an over pressure in the sealing liquid circuit adjacent to the gas filled machine. This results in an unavoidable loss of hydrogen to the air side of the seal.

The object of the invention is thus to achieve a shaft seal for gas-filled machines, particularly hydrogen-cooled turbo-generators, provided with an annular pressure chamber which is supplied with deaerated sealing liquid and does not possess the disadvantages of the previous seals mentioned above.

According to the invention this is achieved by providing at least on one side of the annular pressure chamber a further annular chamber which is in communication by way of the annular gap between the shaft and the seal with the annular pressure chamber and is supplied with sealing liquid which is not deaerated, i.e. a liquid containing a gas.

Figure 2:
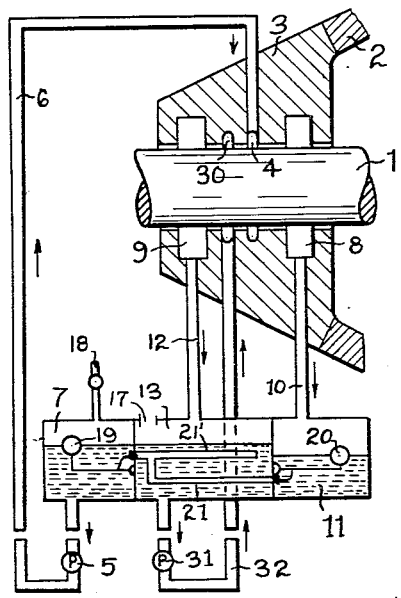
Figure 1:
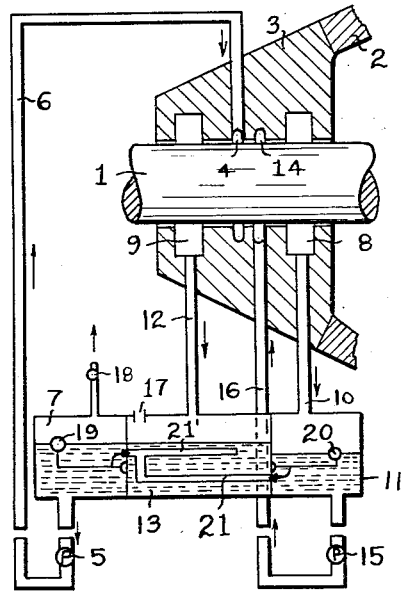

The invention will be further explained with reference to the drawings in which:

FIG. 1 shows diagrammatically one form of the arrangement according to the invention;

FIG. 2 another form of the arrangement according to the invention; and

Figure 3:
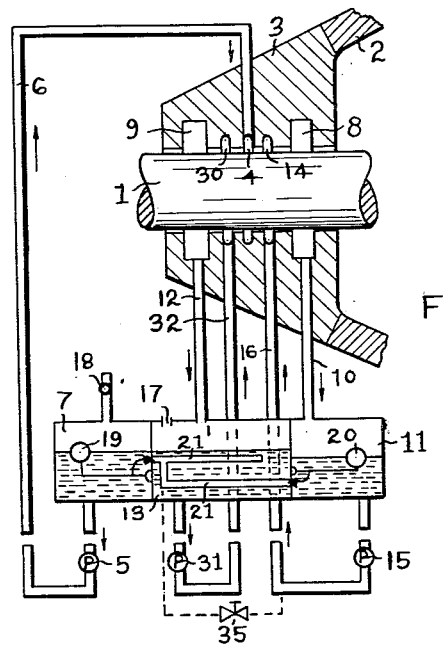

FIG. 3 an arrangement resulting from a combination of the arrangements shown in FIGS. 1 and 2.

In all three cases the invention is applied to a shaft seal for turbogenerators.

In FIGURES 1 to 3, numeral 1 indicates the shaft of a machine the casing 2 of which is filled with gas, for instance hydrogen. This gas serves to cool the machine and is normally at an over-pressure with respect to the atmosphere. A sealing device 3 is provided at the point where the shaft passes through the casing, this device 3 being in the form of a sleeve member having an annular pressure chamber 4 which is supplied with degassed sealing liquid, for instance oil, taken from a vacuum tank 7 by means of a pump 5 and passing through a pipe 6. On the side of the annular pressure chamber 4 facing the gas-filled casing 2 there is an annular collecting space 8 and on the other side adjacent the atmosphere a collecting space 9 for the reception of the sealing liquid. The collecting space 8 is connected by a pipe 10 to a tank 11 and the collecting space 9 by means of a pipe 12 to a reservoir 13.

With the arrangement according to the invention shown in FIG. 1 the seal has a further annular chamber 14 provided next to the annular pressure chamber 4 on the gas side. This chamber 14 is supplied with gas-saturated oil by means of a pump 15 by way of pipe 16 from tank 11, whereby the pressure of this oil is for instance kept somewhat below the pressure of the degassed oil in the annular pressure chamber 4. The flow of oil to annular chamber 14 has the effect of throttling the axial flow of degassed sealing oil from the annular chamber 4 along the shaft towards the collecting chamber 8. The greater part of the degassed oil flows from the pressure chamber 4 along the shaft clearance gap in the opposite direction to the collecting chamber 9 where it absorbs air and then passes to reservoir 13. In accordance with the flow quantity of degassed oil, an equal amount of oil which contains air flows from reservoir 13 into vacuum tank 7 where it is deaerated by means of a vacuum pump 18.

The degassed oil from the annular pressure chamber 4 and the saturated oil from the annular chamber 14 pass to the collecting chamber 8 which is in communication with tank 11 by way of pipe 10. The degassed oil thus absorbs gas, but due to the reduced flow on this side of the seal the loss of gas from the machine is very small. In an analogous manner as on the air side, in accordance with the flow volume of the degassed oil an equal amount of oil containing gas will always flow from tank 11 through a float valve 20 by way of a pipe 21 direct into the vacuum tank 7 where, together with the oil which contains air, it is degassed. Pipe 21 has a branch piece 21' through which oil containing air flows from the degassing device. A float valve 19 regulates the oil supply to the vacuum tank 7 so that the oil level is kept constant. Float valve 20 in tank 11 also serves as a safety valve which prevents sealing liquid from passing into the machine casing.

The arrangement shown in FIG. 1 can be modified so that the oil from the collecting space 9 passes directly to vacuum tank 7 by way of float valve 19, in which case float valve 20 is in direct communication with vacuum tank 7 and reservoir 13 is omitted.

FIG. 2 illustrates a further arrangement according to the invention where an additional annular chamber 30 is provided on the air side of the annular pressure chamber 4, this additional chamber being supplied with air-saturated oil taken by means of a pump 31 from reservoir 13 and passing through pipe 32, the pressure of this oil being maintained somewhat lower than that of the degassed oil supplied from vacuum tank 7 to pressure chamber 4. As a result of this additional circuit supplied with air-saturated oil, the axial flow of degassed oil along the shaft clearance gap in the direction towards the collecting space 9 is greatly reduced. Degassed oil from annular chamber 4 flows in the opposite direction along the shaft clearance gap to collecting space 8 where it absorbs gas and then passes through pipe 10 to tank 11. In accordance with the flow volume of degassed oil, an equal amount of oil will always flow from tank 11 through pipe 21 to vacuum tank 7. The oil from annular chamber 30 which contains air and part of the degassed oil from the annular pressure chamber 4 pass to collecting space 9 that is connected by means of pipe 12 to reservoir 13. Oil containing air flows from reservoir 13 to vacuum tank 7 by way of branch pipe 21'.

The oil supply to vacuum tank 7 is regulated in the same way as in the case of the arrangement shown in FIG. 1 by means of a float valve 19. Float valve 20 in tank 11 serves to regulate the return flow of the oil into reservoir 13 and also acts as a safety device to prevent sealing liquid from entering the machine.

FIG. 3 shows a constructional example of the invention which consists of a combination of the arrangements illustrated in FIGS. 1 and 2, whereby in FIG. 3 the same reference numerals are used as in FIGS. 1 and 2 for the same elements. In this combined arrangement there is an additional annular chamber at each side of the annular pressure chamber 4 which is supplied with degassed oil, each additional chamber being supplied with sealing liquid. On the air side of chamber 4 is an annular chamber 30 supplied with air-saturated oil from reservoir 13 and on the gas side an annular chamber 14 supplied with gas-saturated oil from tank 11. Control valves 19 and 20 which have already been described in connection with the arrangements shown in FIGS. 1 and 2, serve to regulate the flow of sealing liquid to vacuum tank 7. If pump 15 ceases to operate, all the gas-saturated oil flows through valve 20 to vacuum tank 7 or when pump 5 also stops running the oil flows through pipe 21' into reservoir 13 where gas is liberated and passes through a vent 17 to the atmosphere. When any disturbance or defect occurs there is thus always the possibility of keeping the seal in operation solely by means of pump 31, whereby the full sealing liquid pressure is maintained and there is only a very gradual penetration of air into the inside of the machine.

The pressure in the individual annular chambers of the seal can be regulated in a known manner, whereby the pressures are regulated in dependance on the gas pressure inside the machine or at least partly in a mutually dependent manner, or a combination of both methods can be used.

For the arrangement according to FIG. 3, the following method of regulation is particularly advantageous. The pressure of the air-saturated oil in annular chamber 30 is regulated in dependence on the pressure of the gas in the machine by means of a simple differential pressure regulator. The pressure regulation of the gas-saturated oil is achieved in a manner already known in connection with double-circuit seals, that is by means of a self-regulating oil column in the suction pipe of pump 15. Such a regulation is described in my prior United States Patent No. 2,903,280. No special pressure regulation is required for the degassed oil in annular chamber 4, because due to the flow of degassed oil in the clearance gap between the shaft and the sealing chambers, the pressure gradient required for producing the desired pressure occurs automatically. After an initial pressure difference between the degassed and gas-saturated oil, the aforementioned oil column ensures that pressure equality is achieved. In order to obtain a continuous overpressure also with respect to the degassed oil, an adjustable amount of oil is taken continuously from the circuit of the oil containing gas and passed to the degassed oil circuit. This can for instance be achieved by means of a valve 35 as indicated in FIG. 3, or also by means of float valve 20 and pipe 21, on condition that pump 15 is adjusted to produce a suitable pressure difference.

The invention is not restricted to the arrangements described above but can of course also be applied to seals using a floating sealing ring or having a shaft flange (radial shaft gap).

I claim:

1. Sealing device for sealing the rotatable shaft of a gas-filled machine, particularly hydrogen-cooled turbogenerator, utilizing an annular pressure chamber located in a sleeve member surrounding the shaft and supplied with degassed sealing liquid, characterized in that on at least one side of said pressure chamber an additional annular chamber is provided which is in communication with said first annular chamber by way of an annular gap between the shaft and said chambers, said second chamber being supplied with sealing liquid containing a gas.

2. Sealing device according to claim 1, characterized in that the additional annular chamber is located on the gas side of the annular pressure chamber and is supplied with sealing liquid containing gas.

3. Sealing device according to claim 1, characterized in that the additional annular chamber is located on the air side of the annular pressure chamber and is supplied with sealing liquid containing air.

4. Sealing device according to claim 1, characterized in that on both sides of the annular pressure chamber there is an additional annular chamber, one of said additional chambers being supplied with sealing liquid containing gas and the other said additional chamber being supplied with sealing liquid containing air.

5. Sealing device according to claim 1, characterized in that the pressure regulation for the individual annular chambers operates in dependence on the gas pressure in the machine casing.

6. Sealing device as in claim 4, characterized in that the pressure of the sealing liquid containing air is regulated in dependence on the gas pressure in the machine casing and the pressure of the sealing liquid containing gas is regulated by means of a self-regulating oil column in the suction pipe of the pump provided for supplying the gas-saturated sealing liquid, whilst the pressure of the degassed sealing liquid is regulated by the pressure drop in the shaft clearance gap.

References Cited in the file of this patent

UNITED STATES PATENTS

| 2,903,280 | Cuny | Sept. 8, 1959 |
| 2,968,499 | Grobel | Jan. 17, 1961 |

FOREIGN PATENTS

| 802,861 | Great Britain | Oct. 15, 1958 |